(12) United States Patent
Widmer et al.

(10) Patent No.: US 7,590,896 B2
(45) Date of Patent: *Sep. 15, 2009

(54) EMISSION-MONITORING SYSTEM AND METHOD FOR TRANSFERRING DATA

(75) Inventors: Neil Colin Widmer, San Clemente, CA (US); Rekha Anil, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/183,120

(22) Filed: Jul. 31, 2008

(65) Prior Publication Data

US 2008/0288602 A1 Nov. 20, 2008

Related U.S. Application Data

(63) Continuation of application No. 10/710,531, filed on Jul. 19, 2004, now Pat. No. 7,424,647.

(51) Int. Cl.
*G06F 11/00* (2006.01)
(52) U.S. Cl. ....................................................... 714/47
(58) Field of Classification Search .................... 714/47
See application file for complete search history.

(56) References Cited

U.S. PATENT DOCUMENTS

| | | | |
|---|---|---|---|
| 5,680,409 A | 10/1997 | Qin et al. | |
| 6,499,114 B1 | 12/2002 | Almstead et al. | |
| 6,522,994 B1 | 2/2003 | Lang | |
| 6,594,620 B1 | 7/2003 | Qin et al. | |
| 2002/0177978 A1 | 11/2002 | Obenhoff et al. | |
| 2003/0014219 A1 | 1/2003 | Shimizu et al. | |
| 2004/0017291 A1 | 1/2004 | Hardman et al. | |
| 2005/0056079 A1 | 3/2005 | Nagy et al. | |
| 2005/0096759 A1 | 5/2005 | Benjamin, IV et al. | |

FOREIGN PATENT DOCUMENTS

EP 0117075 8/1984

OTHER PUBLICATIONS

GB search report, Application No. GB0513953.0, Date of Search Nov. 9, 2005.

*Primary Examiner*—Michael C Maskulinski
(74) *Attorney, Agent, or Firm*—Cantor Colburn LLP

(57) ABSTRACT

A system and a method for transferring data in an emission-monitoring system from a first computer to a second computer are provided. The method includes generating a first message containing a first software variable having a first site-specific value that is transmitted from the first computer to the second computer. The first site-specific value is indicative of whether one of a fault event, a maintenance event, or a calibration event associated with the first computer has occurred. The method further includes receiving the first message at the second computer, the second computer storing the first site-specific value in a first record of a first database. The first record is associated with the first software variable. The method further includes determining whether the first site-specific value indicates that an event has occurred. Finally, the method includes if the first site-specific value indicates that an event has occurred, then generating a second software variable having both a first predetermined name and a value equal to a first standardized value indicating that an event has occurred, else generating a third software variable having both the first predetermined name and a value equal to a second standardized value indicating that an event has not occurred.

11 Claims, 4 Drawing Sheets

FIG. 2
Database

| Site - Specific Variable Name | Site - Specific Value | Event Variable Name | Site - Specific Event Value | Standardized Variable Name | Standardized Value |
|---|---|---|---|---|---|
| NOX_S1 | 1 | Hold_N1 | 0 | CEM_NOX | 0 |
| CO_S2 | 1 | Hold_C2 | 1 | CEM_CO | 1 |

FIG. 3
First Message From First Emission Monitoring Computer

| [NOX_S1] | 1 |
|---|---|

FIG. 4
Second Message From Second Emission Monitoring Computer

| [CO_S2] | 1 |
|---|---|

EMISSION-MONITORING SYSTEM AND METHOD FOR TRANSFERRING DATA

CROSS REFERENCE TO RELATED APPLICATIONS

This application is a continuation application of U.S. Ser. No. 10/710,531, filed Jul. 19, 2004, the contents of which are incorporated by reference herein in its entirety.

BACKGROUND

Emission-monitoring systems have been developed to monitor emissions or exhaust gases produced during power generation. Generally, such emission-monitoring systems include a plurality of local monitoring devices wherein each local monitoring device monitors emissions produced by a gas turbine or boiler. Each of the local monitoring devices transmits emission information to a central monitoring device. When different types of local monitoring devices are utilized at different geographic sites, each local monitoring device may generate data using different formats, naming conventions, and values to indicate events, such as a fault event, a maintenance event, or a calibration event that are transmitted to the central monitoring computer.

A fault event occurs when any monitoring device is not functioning properly. Detection of the fault event is generally determined during an automatic calibration event when the monitoring device indicates gas levels that do not correlate with known calibration gas levels to within specified limits. A maintenance event occurs when either: (i) one or more devices operably coupled to a local monitoring device are shut down for maintenance, or (ii) a local monitoring device is shut down for maintenance. A calibration event occurs when a calibration gas is being supplied to one or more emission sensors coupled to a local monitoring device.

Because there is no standardized methodology for specifying event variables indicating whether an event has occurred, software developers have had an extremely difficult time attempting to display and manipulate emission information received from local monitoring devices each using site-specific event variable formats.

Thus, there is a need for an emission-monitoring system and method that standardizes event variables or tags received from different local monitoring devices for displaying and manipulating emission information from the local monitoring devices.

BRIEF DESCRIPTION

A method for transferring data in an emission-monitoring system from a first computer to a second computer in accordance with an exemplary embodiment is provided. The method includes generating a first message containing a first software variable having a first site-specific value that is transmitted from the first computer to the second computer. The first site-specific value is indicative of whether one of a fault event, a maintenance event, or a calibration event associated with the first computer has occurred. The method further includes receiving the first message at the second computer, the second computer storing the first site-specific value in a first record of a first database. The first record is associated with the first software variable. The method further includes determining whether the first site-specific value indicates that an event has occurred. Finally, the method includes if the first site-specific value indicates that an event has occurred, then generating a second software variable having both a first predetermined name and a value equal to a first standardized value indicating that an event has occurred, else generating a third software variable having both the first predetermined name and a value equal to a second standardized value indicating that an event has not occurred.

An emission-monitoring system for transferring data from a first computer to a second computer in accordance with another exemplary embodiment is provided. The emission-monitoring system includes a first computer configured to generate a first message containing a first software variable having a first site-specific value. The first site-specific value is indicative of whether one of a fault event, a maintenance event, or a calibration event has occurred. The emission-monitoring system further includes a second computer operably coupled to the first computer. The first computer is further configured to transmit the first message to the second computer. The second computer is further configured to store the first site-specific value in a first record of a first database. The first record is associated with the first software variable. The second computer is further configured to determine whether the first site-specific value indicates that an event has occurred. When the first site-specific value indicates that an event has occurred, the second computer is configured to generate a second software variable having both a second predetermined name and a value equal to a first standardized value indicating that an event has occurred. When the first site-specific value indicates that an event has not occurred, the second computer is configured to generate a third software variable having both the second predetermined name and a value equal to a second standardized value indicating that an event has not occurred.

An article of manufacture in accordance with another exemplary embodiment is provided. The article of manufacture includes a computer storage medium having a computer program encoded therein for transferring data in an emission-monitoring system from a first computer to a second computer. The computer storage medium includes code for generating a first message containing a first software variable having a first site-specific value that is transmitted from the first computer to the second computer, the first site-specific value indicative of whether one of a fault event, a maintenance event, or a calibration event associated with the first computer has occurred. The computer storage medium further includes code for receiving the first message at the second computer and storing the first site-specific value in a first record of a first database. The first record is associated with the first software variable. The computer storage medium further includes code for determining whether the first site-specific value indicates that an event has occurred. The computer storage medium further includes code for generating a second software variable having both a first predetermined name and a value equal to a first standardized value indicating that an event has occurred, if the first site-specific value indicates that an event has occurred. Finally, the computer storage medium includes code for generating a third software variable having both the first predetermined name and a value equal to a second standardized value indicating that an event has not occurred.

Other systems and/or methods according to the embodiments will become or are apparent to one with skill in the art upon review of the following drawings and detailed description. It is intended that all such additional systems and methods be within the scope of the present invention, and be protected by the accompanying claims.

BRIEF DESCRIPTION OF THE DRAWINGS

FIG. 2 depicts a database utilized by the emission-monitoring system of FIG. 1;

FIG. 3 depicts a first message transmitted from an emission-monitoring computer to a central emission-monitoring computer;

FIG. 4 depicts a second message transmitted from an emission-monitoring computer to a central emission-monitoring computer.

DETAILED DESCRIPTION

Figure 1:
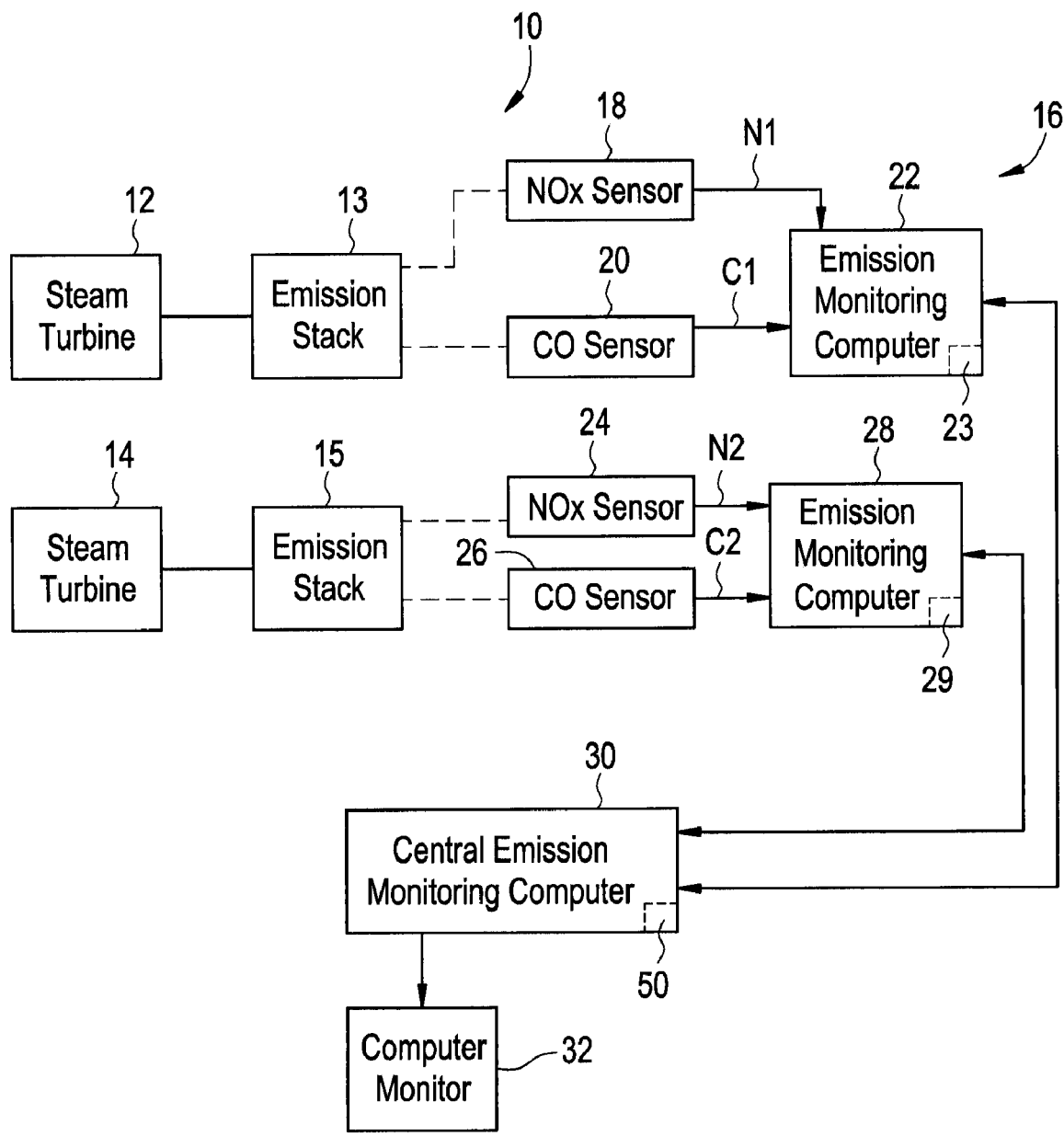
FIG. 1 is a schematic of a power generation system having an emission-monitoring system in accordance with exemplary embodiment.

Referring to FIG. 1, a power generation system 10 for generating electrical power is illustrated. The power generation system 10 includes a gas turbine 12, an emission stack 13, a gas turbine 14, an emission stack 15, and an emission-monitoring system 16.

The gas turbine 12 is provided to generate electricity and is operably coupled to the emission stack 13 which receives exhaust gases from the gas turbine 12 and then releases the gases.

The oxides of nitrogen (NOx) sensor 18 is operably coupled in the emission stack 13 and fluidly communicates with exhaust gases in the emission stack 13. The sensor 18 generates a signal (N1) indicative of the NOx level in the emission stack 13 that is transmitted to the emission-monitoring computer 22.

The carbon monoxide (CO) sensor 20 is operably coupled in the emission stack 13 and fluidly communicates with exhaust gases in the emission stack 13. The sensor 20 generates a signal (C1) indicative of the CO level in the emission stack 13 that is transmitted to the emission-monitoring computer 22.

The emission-monitoring computer 22 is operably coupled to the NOx sensor 18 and the CO sensor 20. The emission-monitoring computer 22 is configured to receive signals from sensors 18 and 20 and to set corresponding software variables to a predetermined values to indicate whether a predetermined event (e.g. fault event, maintenance event, or calibration event) has occurred or not. The emission-monitoring computer 22 further communicates with the central emission-monitoring computer 30 by periodically transmitting messages having the software variables to the computer 30. For example, when a fault event occurred, computer 22 sets a software variable (NOX_S1) to a site-specific value of "0" in an internal memory 23 indicating that a fault event has occurred. Thereafter, a message 52 containing the variable (NOX_S1) is transmitted from computer 22 to the central emission-monitoring computer 30. Similarly, when the signal (C1) indicates that a fault event occurred, computer 30 sets a software variable (CO_S1) to a site-specific value of "1" in an internal memory 23 indicating that a fault event has occurred. Thereafter, a message containing the variable (CO_S1) is transmitted to the central emission-monitoring computer 30.

The emission-monitoring computer 22 is further configured to transmit software variables having site-specific values to the central emission-monitoring computer 30 indicating whether maintenance events or calibration events have occurred.

The gas turbine 14 is provided to generate electricity and is operably coupled to the emission stack 15 which receives exhaust gases from the gas turbine 14 and then releases the gases.

The nitrogen oxide (NOx) sensor 24 is operably coupled in the emission stack 15 and fluidly communicates with exhaust gases in the emission stack 15. The sensor 24 generates a signal (N2) indicative of the NOx level in the emission stack 15 that is transmitted to the emission-monitoring computer 28.

The carbon monoxide (CO) sensor 26 is operably coupled in the emission stack 15 and fluidly communicates with exhaust gases in the emission stack 15. The sensor 26 generates a signal (C2) indicative of the CO level in the emission stack 15 that is transmitted to the emission-monitoring computer 28.

The emission-monitoring computer 28 is operably coupled to the NOx sensor 24 and the CO sensor 26. The emission-monitoring computer 28 is configured to receive signals from sensors 24 and 26 and to set corresponding software variables to a predetermined values to indicate whether a predetermined event has occurred or not. The emission-monitoring computer 28 further communicates with the central emission-monitoring computer 30 by periodically transmitting messages having the software variables to the computer 30. For example, when a fault event occurs, computer 28 sets a software variable (NOX_S2) to a site-specific value of "1" in an internal memory 29 indicating that a fault event has occurred. Thereafter, a message containing the variable (NOX_S2) is transmitted from computer 28 to the central emission-monitoring computer 30. Similarly, when a fault event occurs, computer 28 sets a software variable (CO_S2) to a site-specific value of "1" in an internal memory 29 indicating that a fault event has occurred. Thereafter, a message containing the variable (CO_S2) is transmitted to the central emission-monitoring computer 30.

The central emission-monitoring computer 30 is provided to receive the software variables having site-specific values from the emission-monitoring computers 22 and 28. Thereafter, the computer 30 performs the following tasks: (i) renames the software variables using a standardized naming convention, and (ii) converts the site-specific values of the software variables to standardized values indicative of a fault event, a maintenance event, or a calibration event. In other words, the centralized emission-monitoring computer 30 is configured to receive event data from a plurality of different emission-monitoring computers and to modify the data to a standardized format that can be utilized by the computer 30.

For example, referring to FIGS. 2 and 4, the computer 30 can receive a first message from the emission-monitoring computer 22 containing the variable (NOX_S1) having a site-specific value of "1". The computer 30 stores the variable (NOX_S1) having the site-specific value "1" in a database 50. The database 50 also contains a previously stored variable (HOLD_N1) that has a value of "0" wherein the value "0" corresponds to a fault event value associated with the emission-monitoring computer 22. The computer 30 compares the site-specific value of "1" to the site-specific event value "0" to determine if a fault event has occurred. If the site-specific value equals the site-specific event value, then a fault event has occurred. Otherwise, a fault event has not occurred. In the illustrated example, since the site-specific value of "1" is not equal to the site-specific event value of "0", the computer 30 generates the variable (CEM_NOX) having a standardized value of "0" indicating that no fault event occurred.

Further, referring to FIGS. 3 and 4, the computer 30 can receive a second message 54 from the emission-monitoring computer 22 containing the variable (CO_S2) having a site-specific value of "1". The computer 30 stores the variable (CO_S2) having the site-specific value "1" in the database 50. The database 50 also contains a previously stored variable (HOLD_C2) that has a value of "1" wherein the value "1" corresponds to a fault event value associated with the emission-monitoring computer 28. The computer 30 compares the site-specific value of "1" to the site-specific event value "1" to determine if a fault event has occurred. Because the site-specific value of "1" equals the site-specific event value of "1", the computer 30 generates the variable (CEM_CO) having a standardized value of "1" indicating that a fault event has occurred.

Figure 5:
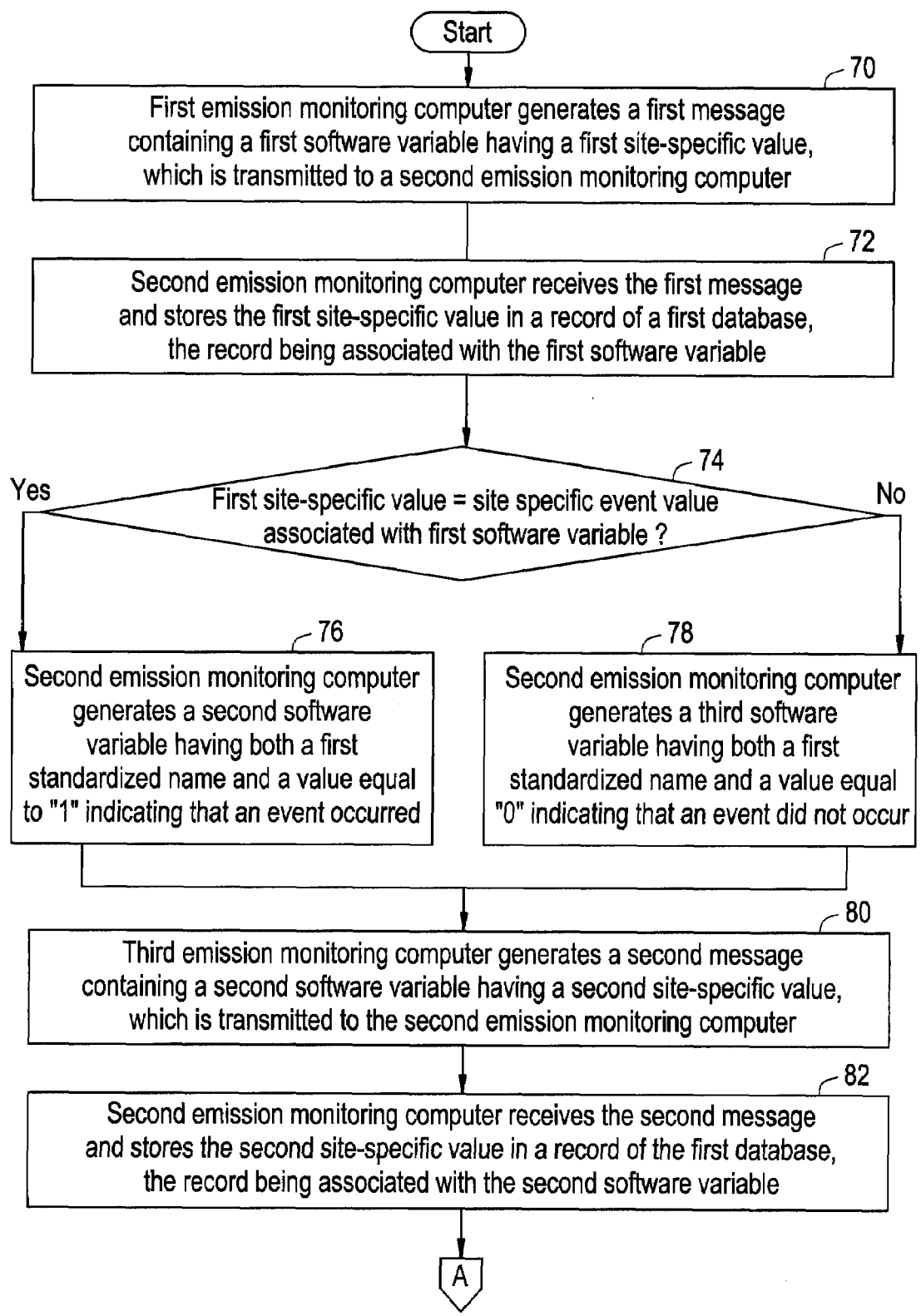
FIGS. 5 and 6 are flowcharts of a method for transferring data in the emission-monitoring system of FIG. 1.
Figure 6:
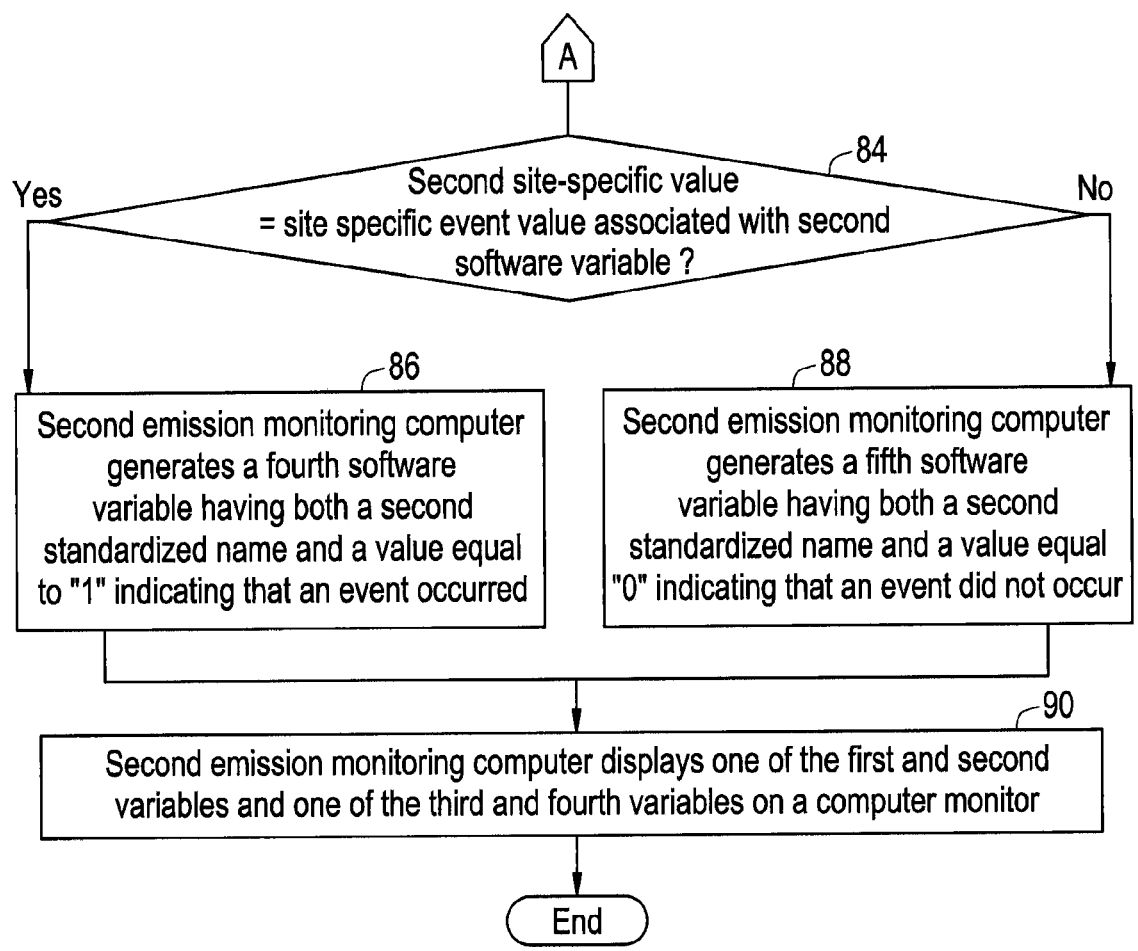

Referring to FIG. 5, a method for transferring data in the emission-monitoring system 16 will now be explained. In particular, the method will be directed to transmitting, reformatting, and displaying fault event information. It should be noted, however, that the method can also be utilized in transferring, formatting, and displaying calibration event information and maintenance event information.

At step 70, the emission-monitoring computer 22 generates a first message 52 containing a first software variable (NOX_S1) having a first site-specific value, which is transmitted to the emission-monitoring computer 30.

At step 72, the central emission-monitoring computer 30 receives the first message 52 and stores the first site-specific value in a record of a database 50, the record being associated with the first software variable (NOX_S1).

At step 74, the central emission-monitoring computer 30 makes a determination as to whether the first site-specific value equals the site-specific event value associated with first software variable (NOX_S1). If the value of step 74 equals "yes", the method advances to step 76. Otherwise, the method advances to step 78.

At step 76, the emission monitoring computer 30 generates a second software variable having both a first standardized name (CEM_NOX) and a value equal to "1" indicating that a fault event has occurred.

At step 78, emission-monitoring computer 30 generates a third software variable having both the first standardized name (CEM_NOX) and a value equal to "0" indicating that a fault event did not occur.

After either of steps 76 or 78, the method advances to step 80. At step 80, the emission-monitoring computer 28 generates a second message 54 containing a second software variable (CO_S2) having a second site-specific value, which is transmitted to the emission-monitoring computer 30.

At step 82, the emission-monitoring computer 30 receives the second message 54 and stores the second site-specific value in a record of the first database, the record being associated with the second software variable (CO_S2).

At step 84, the central emission-monitoring computer 30 makes a determination as to whether the second site-specific value equals the site-specific event value associated with second software variable (CO_S2). If the value of step 84 equals "yes", the method advances to step 86. Otherwise, the method advances to step 88.

At step 86, the emission-monitoring computer 30 generates a fourth software variable having both a second standardized name (CEM_CO) and a value equal to "1" indicating that a fault event has occurred.

At step 88, the emission-monitoring computer 30 generates a fifth software variable having both the second standardized name (CEM_CO) and a value equal to "0" indicating that a fault event did not occur.

After either of steps 86 and 88, the method advances to step 90. At step 90, the emission-monitoring computer 30 displays one of the first and second variables and one of the third and fourth variables on the computer monitor 32.

The system and method for transferring data in an emission monitoring system provides a substantial advantage over other systems and methods. In particular, the system and method provides a technical effect of standardizing the format of information being transmitted from local emission monitoring computers at various geographic sites to a central emission-monitoring computer. Thus, the central emission-monitoring computer can more readily display and manipulate event information from a plurality of different emission-monitoring computers.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and/or executed by a computer, the computer becomes an apparatus for practicing the invention. When implemented on a general-purpose microprocessor, the computer program code segments configure the microprocessor to create specific logic circuits.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiment disclosed for carrying out this invention, but that the invention includes all embodiments falling within the scope of the intended claims. Moreover, the use of the term's first, second, etc. does not denote any order of importance, but rather the term's first, second, etc. are used to distinguish one element from another.

We claim:

1. A method for transferring data in an emission-monitoring system from a first computer to a second computer, comprising:

generating a first message containing a first software variable having a first site-specific value that is transmitted from the first computer to the second computer, the first site-specific value indicative of whether one of a fault event, a maintenance event, or a calibration event associated with the first computer has occurred;

receiving the first message at the second computer, the second computer storing the first site-specific value in a first record of a first database, the first record being associated with the first software variable;

determining whether the first site-specific value is equal to a site-specific event indicator value indicative of an occurrence of an event; and if the first site-specific value is equal to the site-specific event indicator value then generating a second software variable having both a first predetermined name and a value equal to a first standardized value indicating that an event has occurred, else generating a third software variable having both the first predetermined name and a value equal to a second standardized value indicating that an event has not occurred.

2. The method of claim 1, wherein the fault event occurs when an emission monitoring device generates a measured value that is not substantially similar to a predetermined value when the emission monitoring device is monitoring a calibration gas.

3. The method of claim 1, wherein the maintenance event corresponds to a value indicating that the first computer is non-operational.

4. The method of claim 1, wherein the calibration event corresponds to a value indicating that the first computer is receiving calibration data from at least one emission sensor.

5. A method for transferring data in an emission-monitoring system from a first computer to a second computer, comprising:

generating a first message containing a first software variable having a first site-specific value that is transmitted from the first computer to the second computer, the first site-specific value indicative of whether one of a fault event, a maintenance event, or a calibration event associated with the first computer has occurred;

receiving the first message at the second computer, the second computer storing the first site-specific value in a first record of a first database, the first record being associated with the first software variable;

determining whether the first site-specific value is equal to a site-specific event indicator value indicative of an occurrence of an event;

if the first site-specific value is equal to the site-specific event indicator value then generating a second software variable having both a first predetermined name and a value equal to a first standardized value indicating that an event has occurred, else generating a third software variable having both the first predetermined name and a value equal to a second standardized value indicating that an event has not occurred; and displaying one of the first and second standardized values on a computer monitor.

6. The method of claim 1, wherein the first software variable has a site-specific software variable name.

7. The method of claim 1, further comprising:

generating a second message containing a fourth software variable having a second site-specific value that is transmitted from a third computer to the second computer, the second site-specific value indicative of whether one of a fault event, a maintenance event, or a calibration event associated with the third computer has occurred;

receiving the second message at the second computer, the second computer storing the second site-specific value in a fourth record of the first database, the fourth record being associated with the fourth software variable;

determining whether the second site-specific value is equal to another site-specific event indicator value indicative of an occurrence of an event; and if the second site-specific value is equal to the another site-specific event indicator value, then generating a fifth software variable having both a second predetermined name and a value equal to the first standardized value indicating that an event has occurred, else generating a sixth software variable having both the second predetermined name and a value equal to the second standardized value indicating that an event has not occurred.

8. An article of manufacture, comprising:

a computer storage medium having a computer program encoded therein for transferring data in an emission-monitoring system from a first computer to a second computer, the computer storage medium comprising:

code for generating a first message containing a first software variable having a first site-specific value that is transmitted from the first computer to the second computer, the first site-specific value indicative of whether one of a fault event, a maintenance event, or a calibration event associated with the first computer has occurred;

code for receiving the first message at the second computer and storing the first site-specific value in a first record of a first database, the first record being associated with the first software variable;

code for determining whether the first site-specific value is equal to a site-specific event indicator value indicative of an occurrence of an event;

code for generating a second software variable having both a first predetermined name and a value equal to a first standardized value indicating that an event has occurred, if the first site-specific value is equal to the site-specific event indicator value; and code for generating a third software variable having both the first predetermined name and a value equal to a second standardized value indicating that an event has not occurred.

9. The article of manufacture of claim 8, wherein the fault event occurs when an emission monitoring device generates a measured value that is not substantially similar to a predetermined value when the emission monitoring device is monitoring a calibration gas.

10. The article of manufacture of claim 8, wherein the maintenance event corresponds to a value indicating that the first computer is non-operational.

11. The article of manufacture of claim 8, wherein the calibration event corresponds to a value indicating that the first computer is receiving calibration data from at least one emission sensor.

* * * * *